United States Patent
Hotchkies et al.

(10) Patent No.: US 9,305,090 B1
(45) Date of Patent: Apr. 5, 2016

(54) PREDICTIVE PAGE LOADING BASED ON SUGGESTION DATA

(75) Inventors: Blair L. Hotchkies, Bellevue, WA (US); Michael L. Brundage, Kirkland, WA (US); Pongsakorn Teeraparpwong, Bellevue, WA (US); Jason P. Patrikios, Seattle, WA (US); Sarah E. Williams, Seattle, WA (US); Brent Robert Mills, Seattle, WA (US); Alexandru I. Indrei, Seattle, WA (US); Daniel R. Parshall, Redmond, WA (US); John M. Nilles, Poulsbo, WA (US); Sikandar Saifullah, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 207 days.

(21) Appl. No.: 13/037,857

(22) Filed: Mar. 1, 2011

(51) Int. Cl.
*G06F 17/30* (2006.01)

(52) U.S. Cl.
CPC .... *G06F 17/30864* (2013.01); *G06F 17/30867* (2013.01)

(58) Field of Classification Search
None
See application file for complete search history.

(56) References Cited

U.S. PATENT DOCUMENTS

| 5,873,076 A * | 2/1999 | Barr et al. ................. 704/270.1 |
| 7,010,537 B2 * | 3/2006 | Eyal et al. |
| 7,499,940 B1 * | 3/2009 | Gibbs |
| 7,617,202 B2 * | 11/2009 | Brill et al. |
| 7,725,501 B1 * | 5/2010 | Stillman et al. ............. 707/805 |
| 7,836,044 B2 * | 11/2010 | Kamvar et al. ............. 707/713 |
| 8,112,409 B2 * | 2/2012 | Shen et al. .................. 707/706 |
| 8,316,019 B1 * | 11/2012 | Ainslie et al. .............. 707/733 |
| 2002/0042923 A1 * | 4/2002 | Asmussen et al. ............ 725/92 |
| 2006/0080292 A1 * | 4/2006 | Alanzi ........................... 707/3 |
| 2007/0088681 A1 * | 4/2007 | Aravamudan et al. .......... 707/3 |
| 2008/0235594 A1 * | 9/2008 | Bhumkar et al. ............ 715/738 |

* cited by examiner

*Primary Examiner* — Charles Adams
(74) *Attorney, Agent, or Firm* — Thomas Horstemeyer, LLP

(57) ABSTRACT

Disclosed are various embodiments for predictive page loading. A number of speculative search queries are provided to a server. Each speculative search query includes one of a plurality of suggested keywords. The number of speculative search queries is based on the number of suggested keywords. Responses corresponding to the speculative search queries are obtained. Each response includes a corresponding plurality of speculative search results. A portion of speculative search results from more than one of the responses is rendered in a hidden portion of a browser window. The portion of the speculative search results is rendered in a visible portion of the browser window in response to receiving a user instruction to execute a committed search query that includes a suggested keyword in one of the speculative queries.

20 Claims, 10 Drawing Sheets

PREDICTIVE PAGE LOADING BASED ON SUGGESTION DATA

BACKGROUND

Online shoppers interact with product search engines to find products of interest and obtain information about those products. As a user enters keywords into a search form, data from past searches may be used to display suggested keywords to the user. A user can complete the search query more quickly by accepting one of the keyword suggestions.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The various embodiments described herein relate to keyword suggestions provided by a suggestion engine to a browser client. As keyword suggestions are received, multiple speculative queries are formed, each using a keyword suggestion. Results of these speculative queries are downloaded to the browser before the user executes a query. These pre-fetched speculative results are rendered in a hidden portion of the browser window. When the user commits to a search query using one of the keyword suggestions contained in a speculative query, the pre-fetched results are made visible while the browser downloads the remainder of the speculative search results corresponding to the keyword in the committed search query. In the following discussion, a general description of the system and its components is provided, followed by a discussion of the operation of the same.

Figure 1:
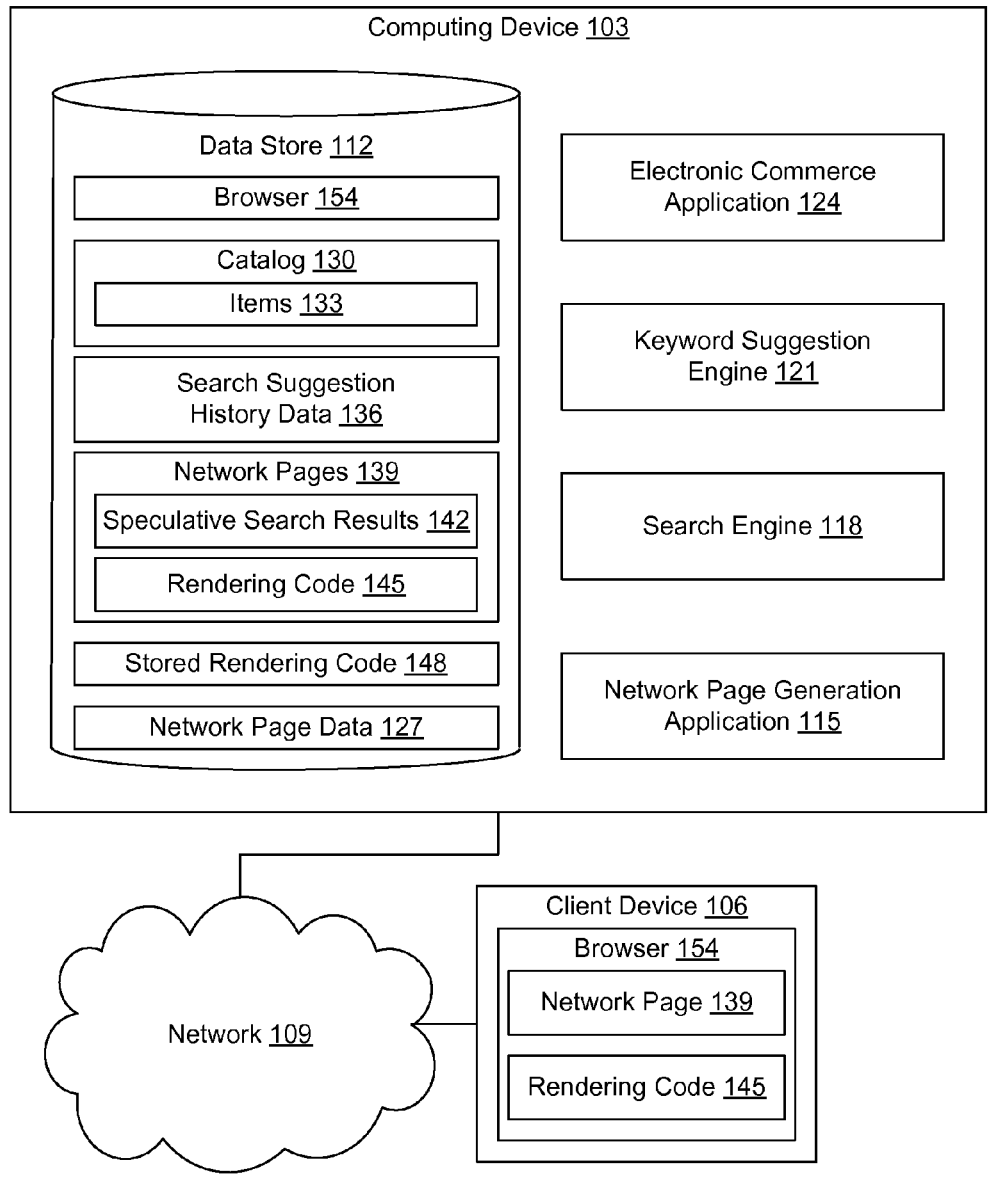
FIG. 1 is a drawing of a networked environment according to one embodiment of the present disclosure.

With reference to FIG. 1, shown is a networked environment 100 according to various embodiments. The networked environment 100 includes one or more computing devices 103 in data communication with one or more client devices 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. A plurality of computing devices 103 together may comprise, for example, a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in various arrangements.

Various applications and/or other functionality may be executed in the computing device 103 according to various embodiments. Also, various data is stored in a data store 112 that is accessible to the computing device 103. The data store 112 may be representative of a plurality of data stores as can be appreciated. The data stored in the data store 112, for example, is associated with the operation of the various applications and/or functional entities described below.

The components executed on the computing device 103 include, for example, a network page generation application 115, a search engine 118, and a keyword suggestion engine 121. In some embodiments, the computing device 103 also includes an electronic commerce application 124. The components executed on the computing device 103 may also include other applications, services, processes, systems, engines, or functionality not discussed in detail herein. These components may communicate with each other using various mechanisms, including but not limited to any type of middleware framework. Though shown as logically separate components, the functionality of the network page generation application 115, the keyword suggestion engine 121, and the search engine 118 can be combined and/or distributed in various ways, as can be appreciated.

The data stored in the data store 112 includes, for example, network page data 127, rendering code 145, a catalog 130 of items 133, search suggestion history data 136, and potentially other data. As used herein, the term "item" 133 may refer to a product, good, service, software download, multimedia download, social networking profile, or other item 133 that may be offered for sale, purchase, rental, lease, download, and/or any other form of consumption, as may be appreciated. Associated with items 133 and stored in catalog 130 are data such as titles, descriptions, keywords, metadata, weights, customer reviews, multimedia, and other data relating to the items 133.

The optional electronic commerce application 124, if present, is executed in order to facilitate the online viewing and/or purchase of items and products over the network 109. The electronic commerce application 124 also performs various backend functions associated with the online presence of a merchant in order to facilitate the online purchase of items, as should be appreciated. In embodiments which include the electronic commerce application 124, the catalog of items comprises a product catalog of items offered for sale, so that data associated with items 133 comprises product data.

The search engine 118 is executed to find items 133 in the catalog 130 using a search query. To provide content in response to user queries, content associated with item(s)

retrieved by a query may be retrieved from the catalog data and encoded for display in a client device 106 by the network page generation application 115.

The keyword suggestion engine 121 is executed to provide suggested keywords as a user enters text into a search query form. The keyword suggestion engine 121 selects one or more keywords that a user is likely to be interested in using search suggestion history data 136 stored in the data store 112. The search suggestion history data 136 may be derived, for example, from historical user data collected by a search profiling service or another application based on previous search queries, page view data, and/or other data. The search suggestion history data 136 may be indexed for a particular user, or may be aggregated across users. In some embodiments, keywords can be suggested to a user based upon matching various aspects of a profile of a user with specific items in the catalog 130. In some embodiments, keywords can be suggested based on the popularity of certain keywords among other users or other factors as can be appreciated. In some embodiments, when used in conjunction with an electronic commerce application 124, keywords can also be suggested to the user based upon the shopping history or preferences of the user, or the popularity of particular items in the catalog 130. The keyword suggestion engine 121 provides the one or more suggested keywords to the client device 106, where the keywords may be presented to the user and/or used to issue a speculative search query as described in further detail below.

The network page generation application 115 is executed to generate network pages 139 that describe items 133 located through a search or by browsing the catalog 130. To this end, the network page generation application 115 uses network page data 127, which may include any type of data related to the generation of network pages 139. Such data may include, for example, templates, executable code, interpreted code, hypertext markup language (HTML), extensible markup language (XML), images, video, text, graphics, and any other type of data that may be used in network pages 139.

The network page generation application 115 may include a network page server and/or other components. The network page server may comprise a commercially available hypertext transfer protocol (HTTP) server such as, for example, Apache® HTTP Server, Microsoft® Internet Information Services (IIS), and other servers.

As described in further detail below, the network page generation application 115 may also add results from one or more speculative search queries to a network page 139. Thus, the network page 139 may include speculative search results 142 and rendering code 145 as well as other content. The combination of the speculative search results 142 and the rendering code 145 stored on a network page 139 allows the client device 106 to pre-load and to render more quickly search results from queries that a user is likely to perform. These speculative queries are formed using keywords provided by the keyword suggestion engine 121. In some embodiments, the speculative search results 142 correspond to the portion of the search results network page 139 that is first seen by the user, a region sometimes referred to as "above the fold."

The network page generation application 115 may be configured to generate the rendering code 145 for a specific network page 139 and/or client device 106 based on stored rendering code 148 in the data store 112. The specific rendering code 145 and the stored rendering code 148 may include, for example, Javascript, dynamic HTML (DHTML), Ajax, and any other type of code that may be executed in a client device 106 from within a network page 139. The specific rendering code 145 and the stored rendering code 148 may also include asynchronous exchange of data with the network page generation application 115, the keyword suggestion engine 121, the search engine 118, or other applications using Ajax, simple object access protocol (SOAP), remote procedure call (RPC), and/or other technologies.

Having discussed the computing device 103, the client device 106 will now be considered. The client device 106 is representative of a plurality of client devices that may be coupled to the network 109. The client device 106 may comprise, for example, a processor-based system such as a computer system. Such a computer system may be embodied in the form of a desktop computer, a laptop computer, a personal digital assistant, a cellular telephone, a set-top box, a music player, a video player, a media player, a web pad, a tablet computer system, a game console, an electronic book reader, or other devices with like capability.

The client device 106 may be configured to execute various applications such as a browser 154 and other applications. The browser 154 may be executed in a client device 106, for example, to access and render network pages 139 or other network content served up by the network page generation application 115, thereby generating a rendered network page. As noted above, the browser 154 may execute the rendering code 145 or other client-side code that is part of a network page 139. Such code may be considered to be part of the browser 154, since it executes within the browser 154. The client device 106 may be configured to execute applications beyond the browser 154 such as, for example, email applications, instant message applications, and/or other applications.

Figure 2:
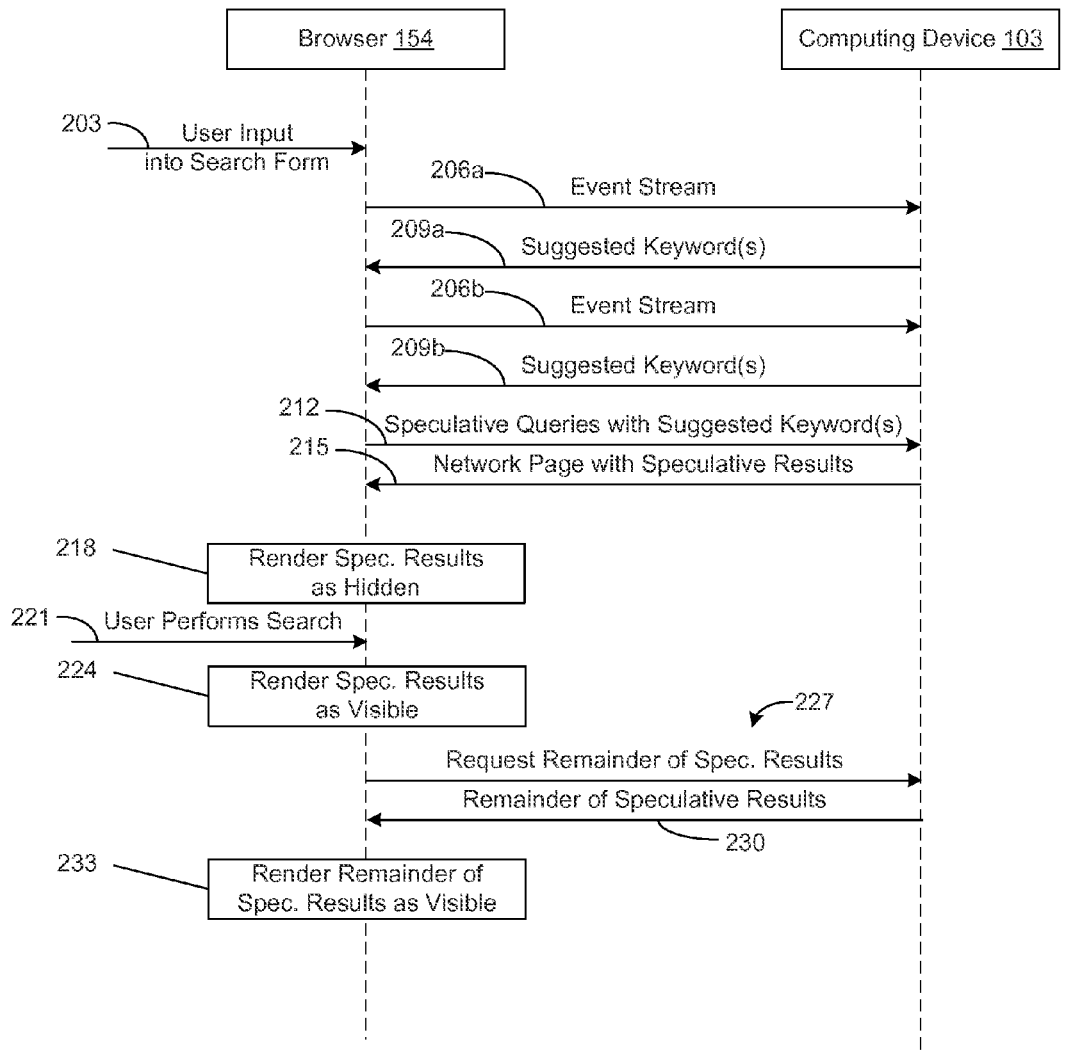
FIG. 2 is a block diagram illustrating various interactions between some of the components in the networked environment of FIG. 1 according to various embodiments of the present disclosure.

Turning to FIG. 2, a general description of the operation of the various components of the networked environment 100 is provided. To begin, at event 203 a user at a client device 106 interacts with the browser 154 by entering keys or characters into a search query form. Periodically, the browser 154 forwards the user input events to the computing device 103 over the network 109 (FIG. 1), shown as events 206a and 206b. As described above, the stream of user input events is processed by the keyword suggestion engine 121, which asynchronously provides a list of one or more suggested keywords to the browser 154, shown as events 209a and 209b.

After receiving some number of suggested keywords, the browser 154 selects more than one of the keywords and issues a set of speculative search queries, each query including a selected keyword. The browser 154 issues these speculative search queries to the computing device 103 at event 212. The number of speculative search queries is based on the number of suggested keywords obtained from the server, so that as more keywords are obtained, more queries are issued.

In some embodiments, the number of speculative search queries also varies in accordance with the number of characters that the user input into the search form. In some embodiments, the number of speculative search queries also varies in accordance with the total duration of the user input into the search form. Thus, the more time the user spends typing into the form, the more queries are issued. In some embodiments, the later suggestions received from the server are preferred over the earlier suggestions. In other embodiments, the earlier suggestions received from the server are preferred over the later suggestions.

At block 215, the computing device 103 obtains results for one or more of the speculative search queries and generates a network page 139 which includes one or more of the speculative search results along with rendering code 145. Each set of speculative search results that corresponds to a particular search query may be a complete list of search results for that query, or may be only a partial list. At block 218, the network page 139 is processed and rendered by the browser 154.

During this processing, the rendering code 145 on the network page 139 executes on the client device 106 to render the speculative search results in a hidden portion of the browser 154. The browser 154 has thus pre-loaded at least a first portion of search results for each of multiple speculative queries.

At event 221, the user performs the search using a keyword from one of the speculative queries. In this manner, one of the once-speculative queries becomes a confirmed query. In response, at block 224 the rendering code 145 executes to make the pre-loaded hidden speculative search results 142 corresponding to that query visible in the browser 154. In this example scenario, the speculative search results are only partial results, so at block 227 the rendering code 145 requests the remaining portion of the search results for the matching speculative query from the network page generation application 115. While block 224 (partial render) is shown before block 227 (download remainder), the order can also be reversed, or the two actions can run substantially concurrently.

At event 230, the remainder of the search results network page 139 is downloaded, and at block 233 the rendering code 145 renders an updated view of the network page 139 so that the remainder of the search results are visible. In some embodiments, the updated view makes the entire new network page 139 visible. In other embodiments, the updated view includes an element such as a viewport, scroll bar, etc., which allows the user to take action to make the remainder visible.

In this manner, the user experience is enhanced by making a prediction about which search queries a user might perform and speculatively issuing those queries, so that the pre-fetched results can be rendered when the user commits to one of the predicted queries. Without this prediction, the download of the search results page would be delayed until the user committed to the query. As described above, the user does not see the speculative search results until user action results in issuance of a committed query containing one of the search term suggestions. The browser embodiment described in connection with FIG. 2 accomplished this by rendering the speculative search results in a hidden portion of the browser window. Other browser embodiments accomplish this by locally storing the speculative search results when they are returned from the computing device 103, but delaying the display of the speculative search results until a user action causes the committed query to be issued.

In some embodiments, the prediction mechanism describe above is used repeatedly. To this end, when returning the remainder of the once-speculative but now-committed search results to the browser 154, the page generation application 115 may also include a portion of another set of speculative search results. The page generation application 115 may decide on a page-by-page basis whether to include additional speculative results along with the remainder data for the last set of speculative results. In some embodiments, the browser 154 does not specifically encode a request for the remainder, but may instead generically encode a request for another network page. In this case, the network page generation application 115 uses stored context to determine that the requested page should include another set of speculative results. The operation of the rendering code 145 will now be described in the context of examples of network pages 139 that are rendered in a browser 154.

FIGS. 3A-E illustrate examples of a network page 139, denoted herein as 139a, 139b, 139c, 139d, and 139e, rendered by rendering code 145 in combination with the browser 154, executing in client device 106 in the networked environment 100. As noted above, the network page 139 is a search result page that is generated by the network page generation application 115. FIGS. 3A-E illustrate various stages of predicting, issuing, and rendering a search query of "tee shirts."

Figure 3A:
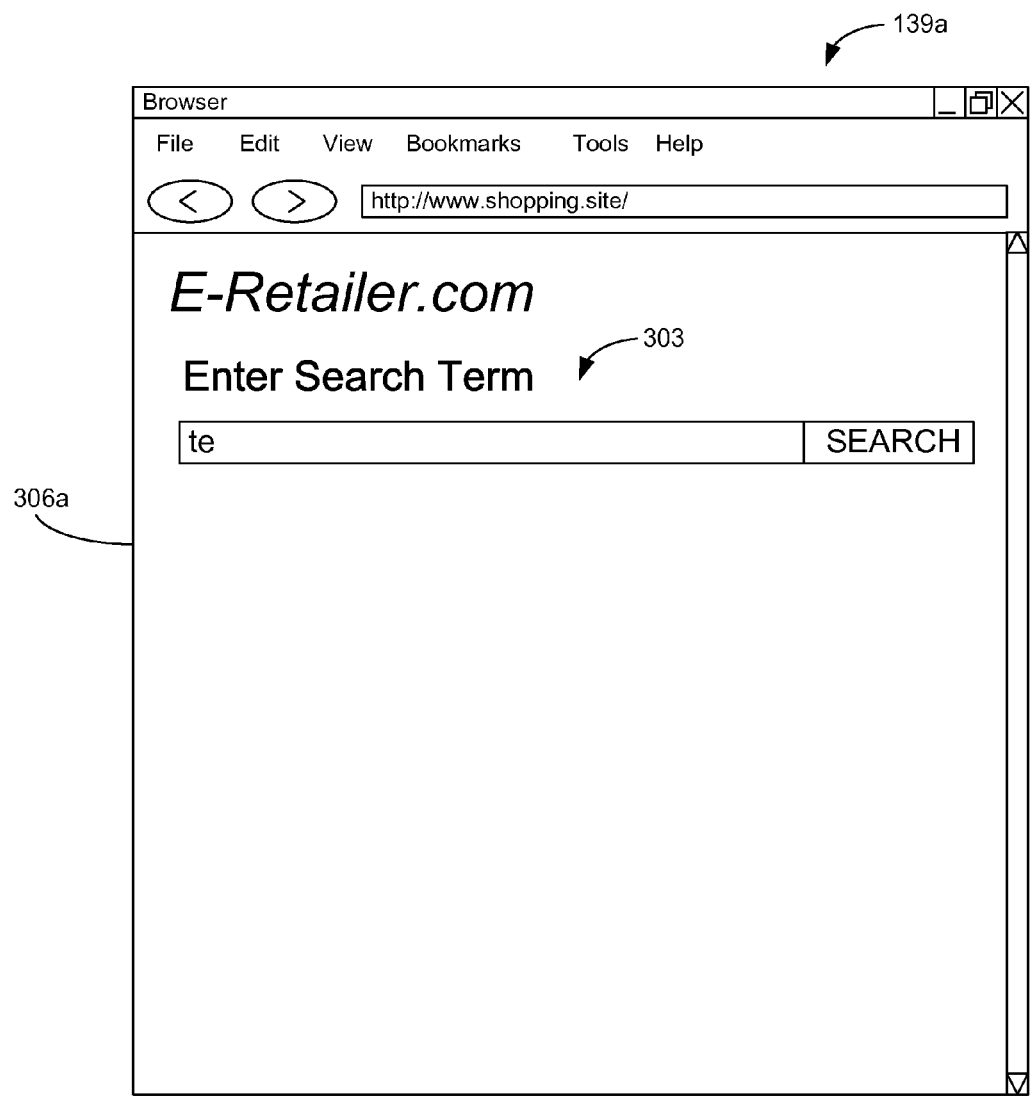
FIGS. 3A-E are drawings of examples of a network page rendered by a client device in the networked environment of FIG. 1 according to various embodiments of the present disclosure.

Referring to FIG. 3A, the network page 139a includes a search query component 303 in a visible portion 306a of the page. A user enters text for a search query into the search query component 303. In the example of FIG. 3A, the user has entered two keys, "t" and "e." As explained above, these keys are provided by the browser 154 to the keyword suggestion engine 121 in the computing device 103, which suggests keywords based on the text entered by the user. In the example of FIG. 3A, the keyword suggestion engine 121 provides the suggestion "team apparel" in response to the user input "te," and the browser 154 issues a speculative search query including that keyword. However, in this example, the suggestion is not yet displayed to the user.

Figure 3B:
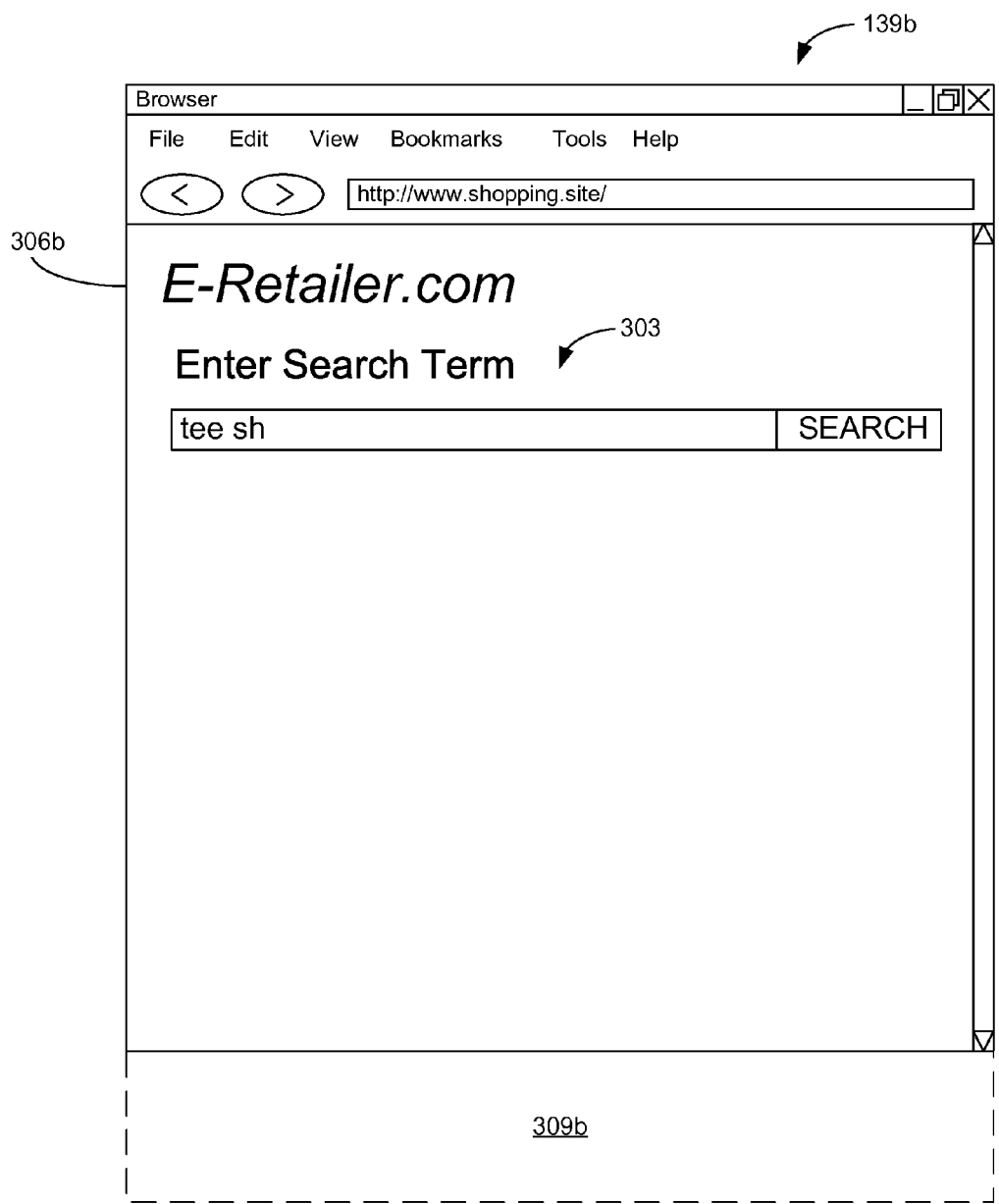

Moving on to FIG. 3B, shown is the network page 139b, which includes the search query component 303 in the visible portion 306b of the page. This network page 139b illustrates the user entering additional text: "e sh." In this example, the keyword suggestion engine 121 has provided a second suggestion of "tee shirt," and the browser 154 preemptively issues a speculative search query for "tee shirt" and receives speculative search results for both "team apparel" and "tee shirt." This retrieval of speculative search results occurs before, and is independent of, a user action to actually request the search. Since the user has not yet committed to a search query, the speculative search results for "team apparel" and "tee shirt" are stored in a hidden portion 309b of the network page 139a, which is not visible in the browser 154.

Figure 3C:
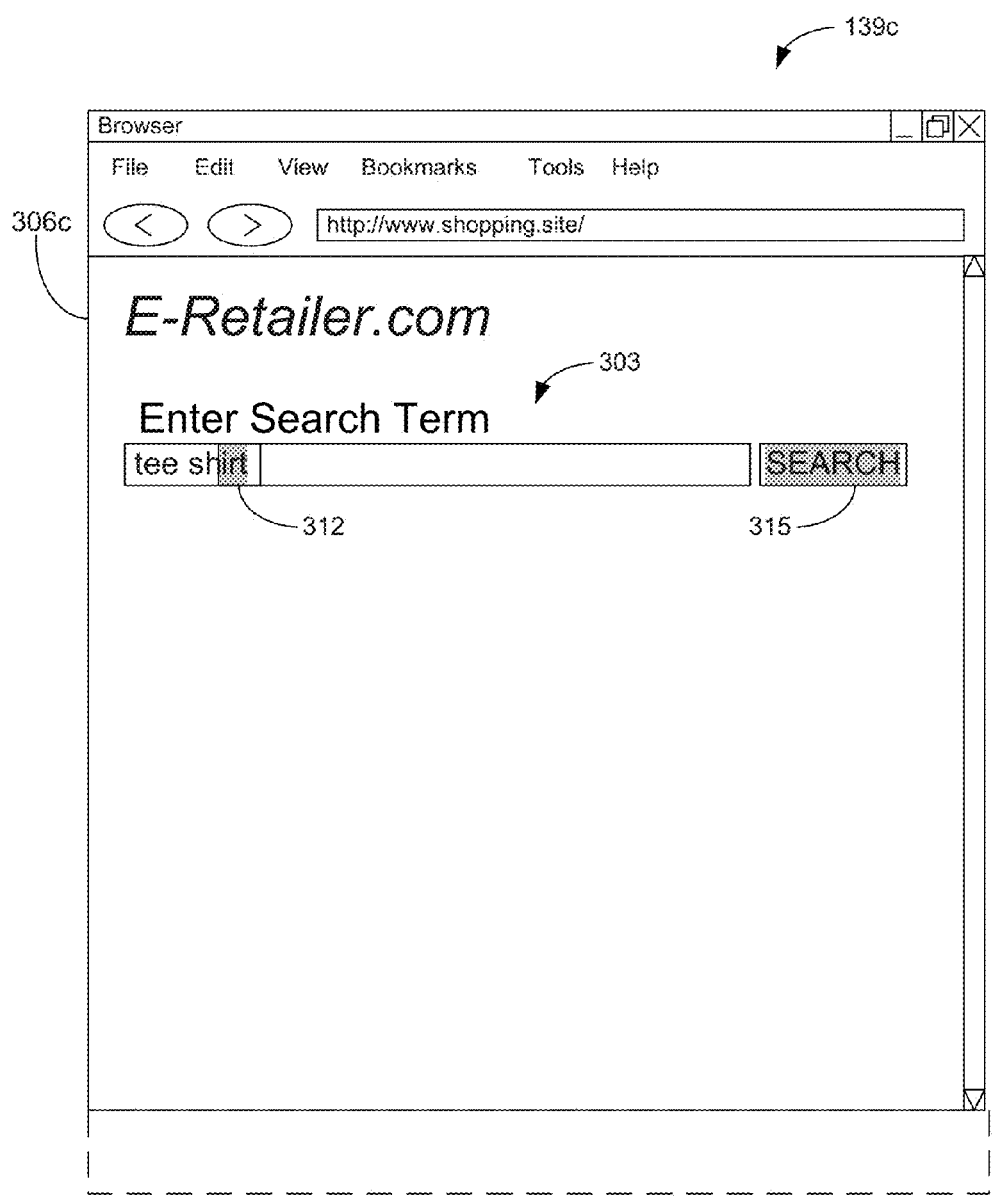

Turning now to FIG. 3C, shown is another network page 139c which includes the search query component 303 in the visible portion 306c of the page. As noted above, the keyword suggestion engine 121 has already provided a suggestion list including "team apparel" and "tee shirt." This network page 139b illustrates that the second suggestion, which more closely matches the text actually typed by the user, is shown to the user by means of highlighted text 312. This network page 139b illustrates that the user has committed to the search query by selecting the "Search" button 315.

Figure 3D:
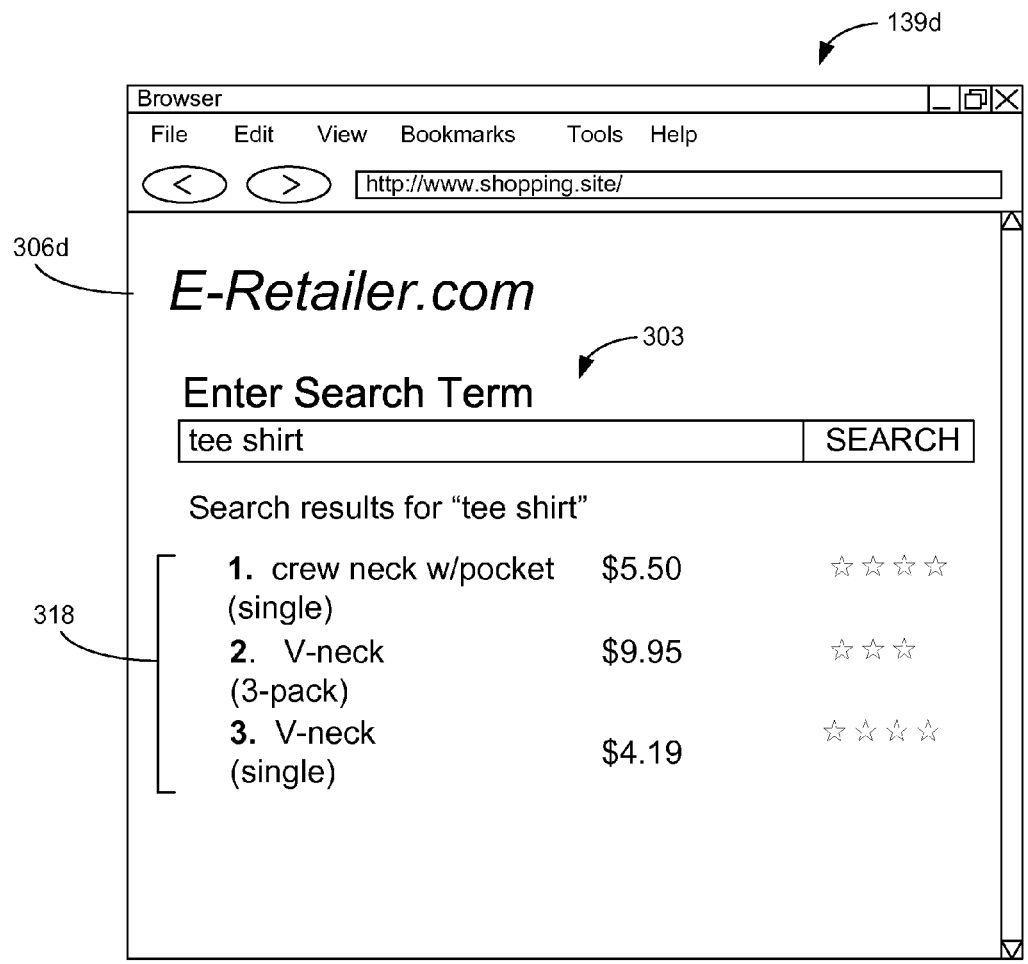

With reference now to FIG. 3D, shown is another network page 139d which is rendered in response the user committing to one of the speculative searches, specifically, to the second speculative search ("tee shirt"). As noted above, search results for both speculative queries were received. Now that the user has committed to one of the queries, the first portion of search results for that query ("tee shirt") are rendered by the rendering code 145 in a list 318 in the visible portion 306d of the page. The results for the other speculative query ("team apparel") are discarded and are not shown to the user. Since the first portion of results was obtained before the user committed to the search, they are made visible without a delay while the remainder of the results from the committed search query is retrieved as described above in connection with FIG. 2. While three items were pre-loaded in this particular example, the number of pre-loaded items may vary, as should be appreciated. For example, the number of pre-loaded items may depend on the resolution of images included in search results, the amount of information included in search results, the number of pre-fetched search results, and/or or other suitable criteria.

Figure 3E:
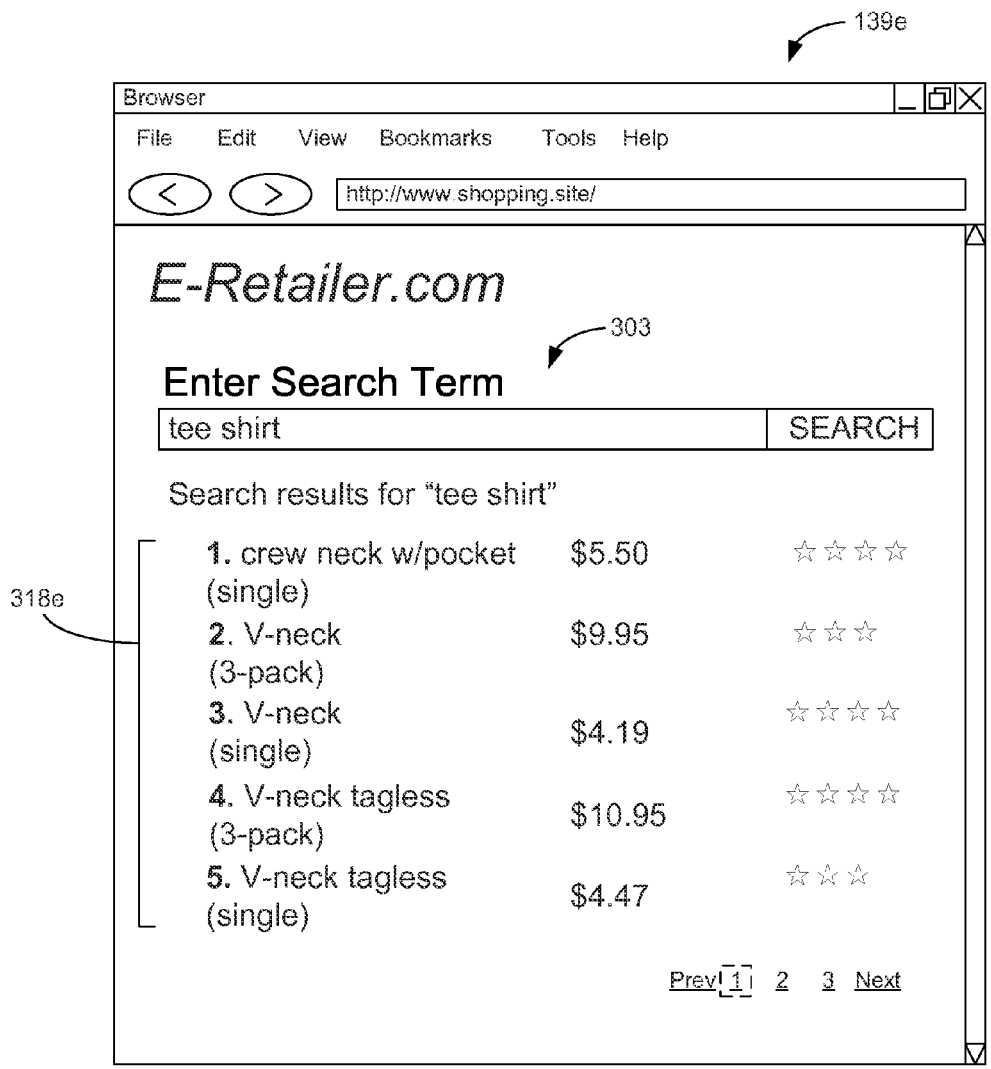

Referring now to FIG. 3E, shown is another network page 139e which is rendered by the rendering code 145 in combination with the browser 154 when the download of the committed search query is complete. All five items of the first page of search results for "tee shirt" are now visible in the search results list 318*e*.

The overall process of using keyword suggestions to fetch search result network pages 139 for multiple speculative search queries was described above in connection with FIGS. 1, 2, and 3A-E. The operation of the client side components will now be described in more detail.

Figure 4A:
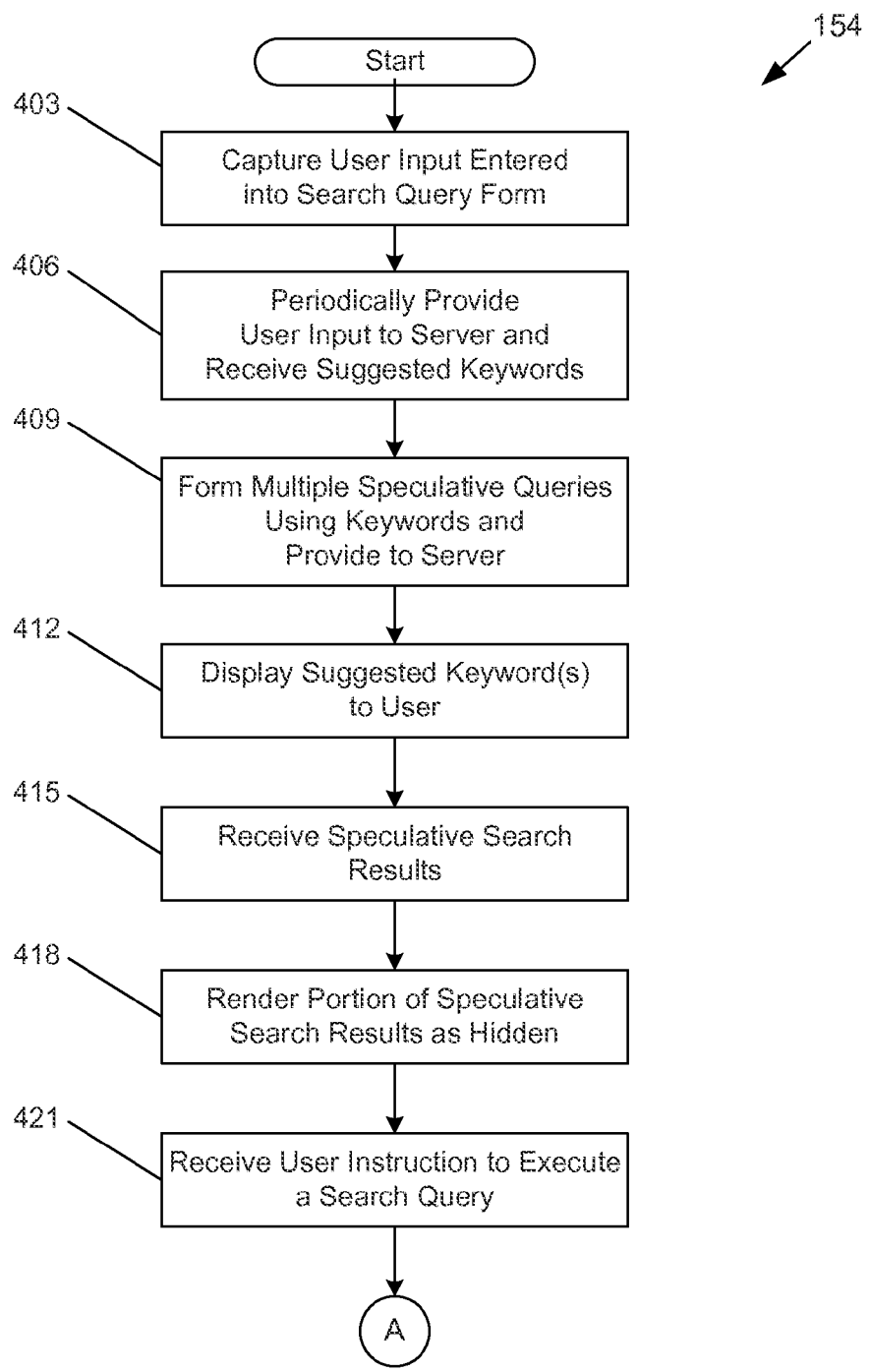
FIGS. 4A and 4B are a flowchart illustrating an example of functionality implemented as portions of a network page generation application executed in a computing device in the networked environment of FIG. 1 according to various embodiments of the present disclosure.
Figure 4B:
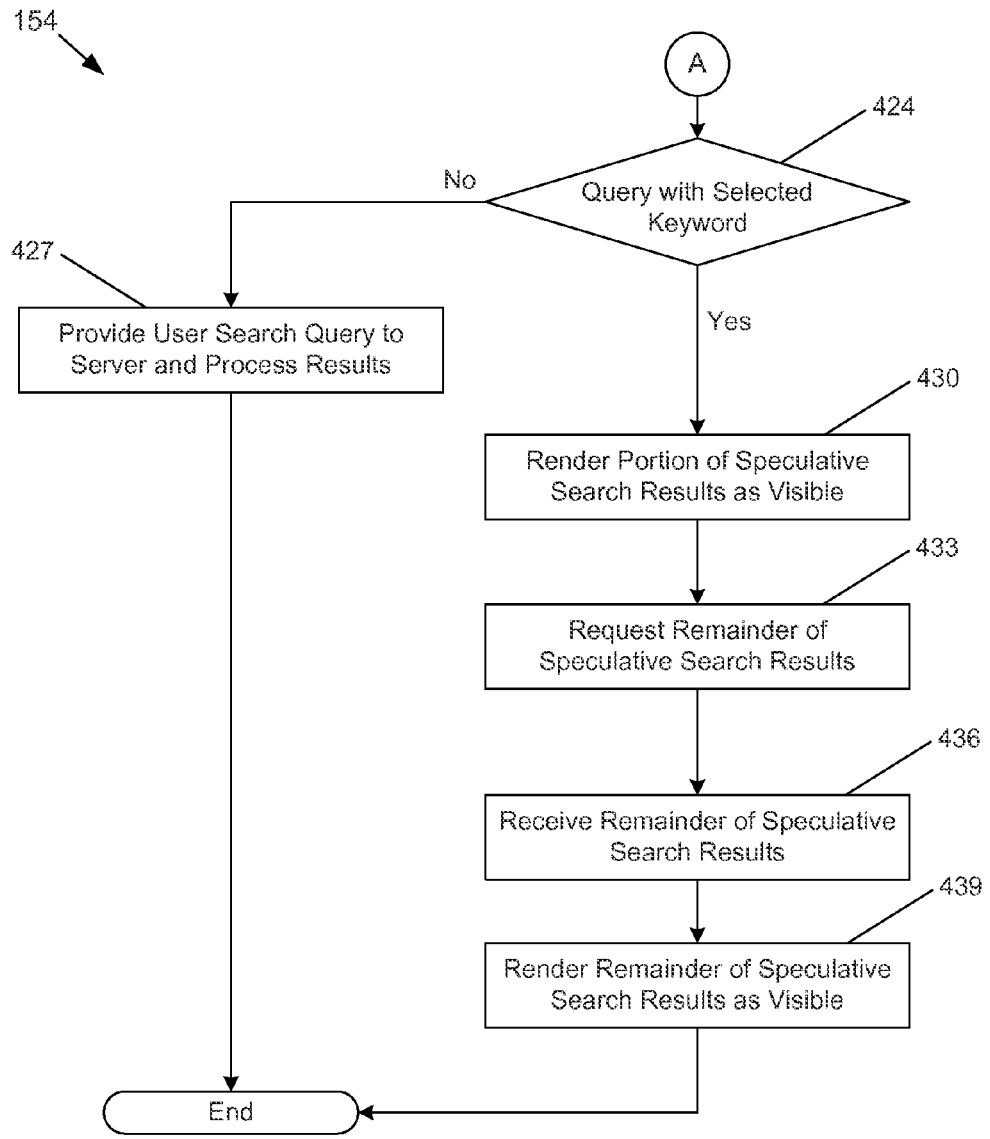

Turning now to FIGS. 4A and 4B, shown is a flowchart that provides one example of the operation of a portion of the rendering code 145 (FIG. 1) in combination with the browser 154 (FIG. 1) according to various embodiments. It is understood that the flowchart of FIGS. 4A and 4B provides merely an example of the many different types of functional arrangements that may be employed to implement the operation of the portion of the browser 154 as described herein. As an alternative, the flowchart of FIGS. 4A and 4B may be viewed as depicting an example of steps of a method implemented in the client device 106 (FIG. 1) according to one or more embodiments.

Beginning at box 403 in FIG. 4A, the browser 154 captures user input entered into a search query component 303 within a network page 139. At box 406, the browser 154 periodically provides the user input to the computing device 103, for processing by the keyword suggestion engine 121, and in return receives one or more suggested keywords. Next, at box 409 the browser 154 forms a set of speculative search queries, where each query includes one of the suggested keywords, and provides these speculative search queries to the computing device 103. The browser 154 may use all of the keyword suggestions, or only a subset. In some embodiments, the first keyword suggestion is selected for inclusion in a query. In other embodiments, the first N suggestions are selected, where N may vary, as can be appreciated. At box 412, the suggested keywords obtained from the server in box 406 are displayed to the user in the search query component 303.

The number of speculative search queries issued by the browser 154 is based on the number of suggested keywords obtained from the server, so that as more keywords are obtained, more queries are issued. In some embodiments, the number of speculative search queries also varies in accordance with the number of characters that the user input into the search form. In some embodiments, the number of speculative search queries also varies in accordance with the total duration of the user input into the search form.

In some embodiments, the keyword suggestion engine 121 returns a probability score for each suggestion, where the score indicates the probability of a user selecting that particular keyword. In such embodiments, the browser 154 may utilize this score in determining how many speculative queries to issue. For example, the browser 154 may issue queries for the three keywords with the highest score, or for the five keywords with the highest score, or some other number. As another example, the browser 154 may issue queries for all keywords with a score exceeding a particular threshold.

In some embodiments, customer-specific data is used to determine how many speculative queries are issued. Examples of such data include: the total amount of items purchased; the frequency of items purchased; the number of services used by a customer; and the number of services paid for by a customer; the geographic location of a customer; and the age of the customer relationship (e.g. new customers are allocated more queries, or old customers are allocated more resources). In this manner, a system operator can choose to allocate the compute resources required to implement the prediction and speculative query feature for some customers but not others. In some embodiments, the computing device 103 may provide this customer-specific limit to the browser 154 as part of an initialization process. In other embodiments, the computing device 103 may return an appropriate error message if the number of speculative queries submitted by the browser 154 exceeds this limit, and the browser 154 then takes this limit into account in submitting future queries.

In some embodiments, the keyword suggestion engine 121 provides enhanced suggestions, and the browser 154 uses the enhancement in determining which suggested keywords are used in the speculative queries. For example, the keyword suggestion engine 121 may provide keyword suggestions that include a spelling correction and/or keyword suggestions that include a suggested category. The browser 154 may give more weight to, and thus prefer, enhanced suggestions as compared to unenhanced suggestions.

Having issued one or more speculative search queries at box 409, at box 415 the browser 154 receives results from one or more of the speculative search queries issued in box 409. At box 418 the rendering code 145 executes in the browser 154 to render the received speculative search results from one or more queries in a hidden portion of the browser 154. In the embodiment discussed here in connection with FIGS. 4A and 4B, the speculative search results provided by the computing device 103 represent only a portion of the results for a particular query, with the remainder being fetched later. In other embodiments, the computing device 103 provides the entire search result set for a query in a single response. Next, at box 421 the browser 154 receives a user instruction to execute a search query.

The flowchart continues at box in FIG. 4B, where the browser 154 determines at box 424 whether the query executed by the user includes a suggested keyword from any of the speculative search results, or whether the user query includes a different keyword. If the user did not execute a query for a speculative keyword, then at box 427 the browser 154 provides a search query including the user's keyword to the computing device 103. Since the speculative search query was incorrect (a "miss"), the search results are processed in a conventional manner and the search query process of FIGS. 4A and 4B is complete.

If instead it is determined at box 424 that the query executed by the user corresponds to a suggested keyword used in one of the speculative search queries, then one of the speculative search queries is a correct prediction (a "hit"). Therefore, at box 430 the rendering code 145 determines which of the speculative results previously received at box 418 corresponds to the query executed by the user, and re-renders those results in the visible portion of the browser 154. Next, since the query was confirmed by the user at box 433 the browser 154 requests from the computing device 103 any remaining portion of search results from the correctly predicted speculative search query. At box 436, the browser 154 receives the requested remainder, and at box 439 the browser 154 renders the remainder in the visible portion of the browser 154. At this point, all results for first-speculative and now-confirmed search query are visible, both the pre-loaded partial results and the just received remainder. The process of FIGS. 4A and 4B is then complete.

Figure 5:
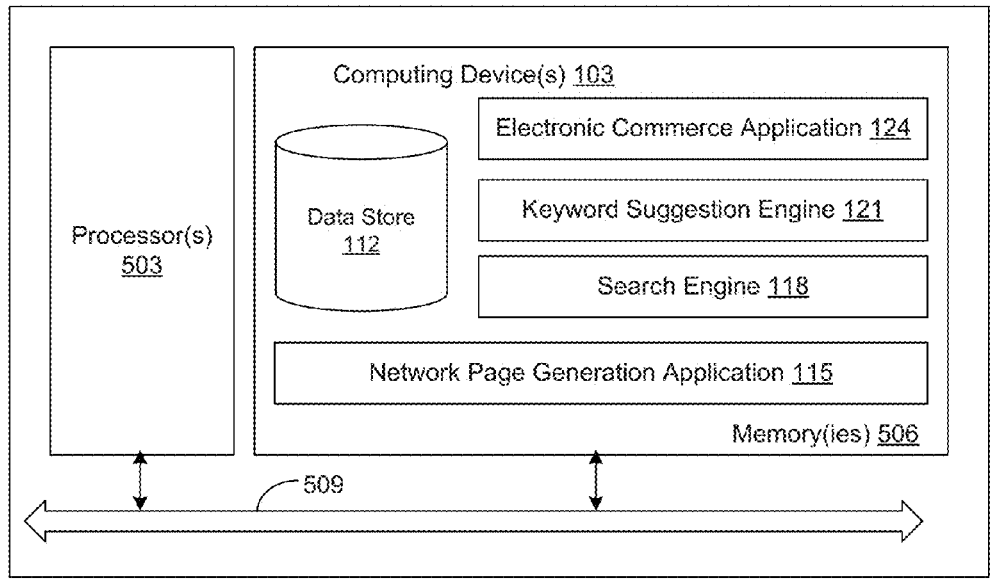
FIG. 5 is a schematic block diagram that provides one example illustration of a computing device employed in the networked environment of FIG. 1 according to various embodiments of the present disclosure.

Moving on to FIG. 5, shown is a schematic block diagram of the computing device 103 according to an embodiment of the present disclosure. The computing device 103 includes at least one processor circuit, for example, having a processor 503 and a memory 506, both of which are coupled to a local interface 509. To this end, the computing device 103 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the network page generation application 115, the search engine 118, the electronic commerce application 124, the keyword suggestion engine 121, and potentially other applications. Also stored in the memory 506 may be a data store 112 and other data. In addition, an operating system may be stored in the memory 506 and executable by the processor 503.

Figure 6:
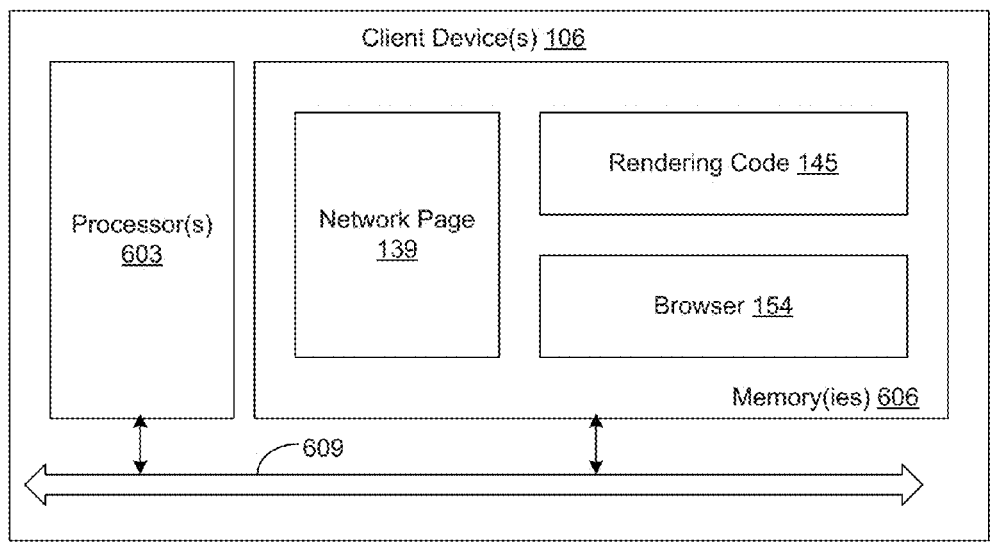
FIG. 6 is a schematic block diagram that provides one example illustration of a client device employed in the networked environment of FIG. 1 according to various embodiments of the present disclosure.

Turning now to FIG. 6, shown is a schematic block diagram of the computing device 103 according to an embodiment of the present disclosure. The computing device 103 includes at least one processor circuit, for example, having a processor 603 and a memory 606, both of which are coupled to a local interface 609. To this end, the computing device 103 may comprise, for example, at least one server computer or like device. The local interface 509 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the browser 154, the rendering code 145, and potentially other applications. In addition, an operating system may be stored in the memory 606 and executable by the processor 603.

It is understood that there may be other applications that are stored in the memories 506, 606 and are executable by a respective one of the processors 503, 603 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memories 506, 606 and are executable by a respective one of the processors 503, 603. In this respect, the term "executable" means a program file that is in a form that can ultimately be run by a respective one of the processors 503, 603. Examples of executable programs may be, for example, a compiled program that can be translated into machine code in a format that can be loaded into a random access portion of the memories 506, 606 and run by a respective one of the processors 503, 603, source code that may be expressed in proper format such as object code that is capable of being loaded into a random access portion of the memories 506, 606 and executed by a respective one of the processors 503, 603, or source code that may be interpreted by another executable program to generate instructions in a random access portion of the memories 506, 606 to be executed by a respective one of the processors 503, 603, etc. An executable program may be stored in any portion or component of the memories 506, 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memories 506, 606 are defined herein as including both volatile and nonvolatile memory and data storage components. Volatile components are those that do not retain data values upon loss of power. Nonvolatile components are those that retain data upon a loss of power. Thus, the memories 506, 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, each of the processors 503, 603 may represent multiple processors and each of the memories 506, 606 may represent multiple memories that operate in parallel processing circuits, respectively. In such a case, the local interface 509, 609 may be an appropriate network 109 (FIG. 1) that facilitates communication between any two of the multiple processors 503, 603, between any of the processors 503, 603 and any of the memories 506, 606, or between any two of the memories 506, 606, etc. The local interface 509, 609 may comprise additional systems designed to coordinate this communication, including, for example, performing load balancing. Each of the processors 503, 603 may be of electrical or of some other available construction.

Although the network page generation application 115, the search engine 118, the electronic commerce application 124, the keyword suggestion engine 121, the browser 154, the rendering code 145, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 4A-B and FIG. 5 show the functionality and operation of an implementation of portions of the network page generation application 115 and the browser 154. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as one of the processors 503, 603 in a computer system or other system. The machine code may be converted from the source code, etc. If embodied in hardware, each block may represent a circuit or a number of interconnected circuits to implement the specified logical function(s).

Although the flowcharts of FIGS. 4A-B and FIG. 5 show a specific order of execution, it is understood that the order of execution may differ from that which is depicted. For example, the order of execution of two or more blocks may be scrambled relative to the order shown. Also, two or more blocks shown in succession in flowcharts of FIGS. 4A-B and FIG. 5 may be executed concurrently or with partial concurrence. Further, in some embodiments, one or more of the blocks shown in FIGS. 4A-B and FIG. 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the network page generation application 115, the search engine 118, the electronic commerce application 124, the keyword suggestion engine 121, the browser 154, and rendering code 145, that comprises software or code can be embodied in any non-transitory computer-readable medium for use by or in connection with an instruction execution system such as, for example, one of the processors 503, 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium having a plurality of computer instructions executable in a computing device, wherein, when executed, the plurality of computer instructions causes the computing device to:
   periodically provide user input to a server, the user input entered into a search query form;
   request a plurality of suggested keywords from the server in response to the user input, wherein at least one of the plurality of suggested keywords is based at least in part on a shopping history associated with a user account corresponding to an electronic commerce application, and wherein at least one of the plurality of suggested keywords comprises at least one enhanced suggested keyword, the at least one enhanced suggested keyword including at least one spelling correction to the user input;
   provide a number of a plurality of speculative search queries to the server, wherein individual ones of the plurality of speculative search queries include at least one of the plurality of suggested keywords, and wherein the number of the plurality of speculative search queries is based at least in part on a length of time that the user account has been associated with the electronic commerce application, and wherein individual ones of the plurality of speculative search queries that include the at least one of the plurality of suggested keywords that comprise the at least one enhanced suggested keyword are weighted higher than individual ones of the plurality of speculative search queries that fail to include the at least one of the plurality of suggested keywords that comprise the at least one enhanced suggested keyword, wherein the weights of the suggested keywords are used to prefer the at least one of the plurality of suggested keywords that comprise the at least one enhanced suggested keyword over individual ones of the plurality of speculative search queries that fail to include the at least one of the plurality of suggested keywords that comprise the at least one enhanced suggested keyword when determining suggested keywords to include in the speculative search queries;
   process a plurality of responses, individual ones of the plurality of responses corresponding to at least one of the plurality of speculative search queries, the individual ones of the plurality of responses including a corresponding plurality of speculative search results;
   render, in a hidden portion of a browser window, at least a portion of the plurality of speculative search results from more than one of the plurality of responses, wherein at least one of the more than one of the plurality of responses corresponds to the at least one of the plurality of speculative search queries that includes the at least one of the plurality of suggested keywords that comprises the at least one enhanced suggested keyword;
   move the rendered portion of at least two of the plurality of speculative search results from the hidden portion of the browser window to a visible portion of the browser window;
   render the at least a portion of the plurality of speculative search results in the visible portion of the browser window in response to receiving a user instruction to execute a committed search query that includes a suggested keyword in at least one of the plurality of speculative queries, wherein the visible portion of the browser window is separate from the hidden portion of the browser window;
   request a remaining portion of at least one of the speculative search results; and
   render, in the visible portion of the browser window, the remaining portion of at least one of the speculative search results.

2. The non-transitory computer-readable medium of claim 1, wherein the user input comprises at least one of a character or a key.

3. The non-transitory computer-readable medium of claim 1, wherein the number of the plurality of speculative search queries increases as the plurality of suggested keywords requested from the server increases.

4. The non-transitory computer-readable medium of claim 1, wherein the number of the plurality of speculative search queries also varies in accordance with a number of characters in a user input provided to the server.

5. The non-transitory computer-readable medium of claim 1, wherein the number of the plurality of speculative search queries increases as a number of suggested keywords obtained from the server increases.

6. The non-transitory computer-readable medium of claim 1, wherein the number of the plurality of speculative search queries is based at least in part on a score for each of the plurality of suggested keywords obtained from the server, and wherein the score is obtained from the server.

7. A method, comprising:
providing, by a computing device, user input from a query form to a server;
providing, by the computing device, a number of a plurality of speculative search queries to the server, individual ones of the plurality of speculative search queries including at least one of a plurality of suggested keywords obtained from the server, wherein at least one of the plurality of suggested keywords comprises at least one enhanced suggested keyword, the at least one enhanced suggested keyword including at least one spelling correction to the user input, wherein the number of the plurality of speculative search queries is based at least in part on a length of time that a user account has been associated with an electronic commerce application and wherein some of the plurality of suggested keywords are based at least in part on a shopping history associated with the user account corresponding to the electronic commerce application or a popularity of an item offered for sale through the electronic commerce application, and wherein individual ones of the plurality of speculative search queries that include the at least one of the plurality of suggested keywords that comprises the at least one enhanced suggested keyword are weighted higher than individual ones of the plurality of speculative search queries that fail to include the at least one of the plurality of suggested keywords that comprises the at least one enhanced suggested keyword, wherein the weights of the suggested keywords are used to prefer the at least one of the plurality of suggested keywords that comprises the at least one enhanced suggested keyword over individual ones of the plurality of speculative search queries that fail to include the at least one of the plurality of suggested keywords that comprises the at least one enhanced suggested keyword when determining suggested keywords to include in the speculative search queries;
processing a plurality of responses in the computing device, individual ones of the plurality of responses corresponding to at least one of the plurality of speculative search queries, the individual ones of the plurality of responses including a corresponding plurality of speculative search results;
rendering, in a hidden portion of a browser window in the computing device, at least a portion of the plurality of speculative search results from more than one of the plurality of responses;
in response to receiving a user input to execute a committed search query that includes a suggested keyword in at least one of the plurality of speculative search queries, rendering the portion of the plurality of speculative search results in a visible portion of the browser window in the computing device, wherein the visible portion of the browser window is separate from the hidden portion of the browser window; and
rendering, in the visible portion of the browser window, a remaining portion of results from at least one of the speculative search queries, in response to receiving the remaining portion of results from the server.

8. The method of claim 7, wherein the number of the plurality of speculative search queries also varies in accordance with a number of characters in a user input provided to the server.

9. The method of claim 7, wherein the number of the plurality of speculative search queries increases as a number of suggested keywords obtained from the server increases.

10. The method of claim 7, further comprising selecting the suggested keywords for inclusion into the speculative search queries, wherein the selection is based at least in part on an order in which the suggested keywords were obtained from the server.

11. The method of claim 7, wherein the user input comprises at least one of a character or a key.

12. The method of claim 7, wherein the user input includes keys and timing information associated with entry of the keys.

13. The method of claim 7, further comprising requesting the remaining portion of at least one of the plurality of speculative search results.

14. The method of claim 7, wherein the number of the plurality of speculative search queries is based at least in part on a score for each of the plurality of suggested keywords obtained from the server, and wherein the score is obtained from the server.

15. A system, comprising:
at least one computing device comprising a processor and a memory; and
an application executable in the at least one computing device, the application causing the at least one computing device to at least:
request a plurality of suggested keywords from a server in response to user input submitted through a query form, wherein at least one of the plurality of suggested keywords is based at least in part on a shopping history associated with a user account corresponding to an electronic commerce application or a popularity of an item offered for sale through the electronic commerce application and at least one of the plurality of suggested keywords comprises at least one enhanced suggested keyword, the at least one enhanced suggested keyword including at least one spelling correction to the user input;
determine a number of a plurality of speculative search queries, the number of the plurality of speculative search queries being determined based at least in part on a length of time that the user account has been associated with the electronic commerce application;
provide the plurality of speculative search queries to the server, wherein individual ones of the plurality of speculative search queries comprise at least one of the plurality of suggested keywords, and wherein individual ones of the plurality of speculative search queries that include the at least one of the plurality of suggested keywords that comprises the at least one enhanced suggested keyword are weighted higher than individual ones of the plurality of speculative search queries that fail to include any of the at least one of the plurality of suggested keywords that comprises the at least one enhanced suggested keyword, wherein the weights of the suggested keywords are used to prefer the at least one of the plurality of suggested keywords that comprises the at least one enhanced suggested keyword over individual ones of the plurality of speculative search queries that fail to include the at least one of the plurality of suggested keywords that comprises the at least one enhanced suggested keyword when determining suggested keywords to include in the speculative search queries;

render, in a hidden portion of a browser window, at least a portion of at least two of a plurality of speculative search results, the at least two of the plurality of speculative search results correspond to at least one of the plurality of speculative search queries;

move the rendered portion of the at least two of the plurality of speculative search results from the hidden portion of the browser window to a visible portion of the browser window;

render the portion of the at least two of the plurality of speculative search results in the visible portion of the browser window in response to receiving a user instruction to execute a committed search query that includes a suggested keyword from the at least one of the plurality of speculative queries; and render, in the visible portion of the browser window, a remaining portion of the plurality of speculative search results from at least one of the plurality of speculative search queries, in response to receiving the remaining portion of results from the server.

16. The system of claim 15, wherein the application further causes the at least one computing device to at least request a remaining portion of at least one of the plurality of speculative search results.

17. The system of claim 15, wherein the application further causes the at least one computing device to at least provide the plurality of speculative search queries to the server before receiving the user instruction to execute the committed search query.

18. The system of claim 15, wherein individual ones of the number of speculative search queries are provided to the server as a corresponding suggested keyword is obtained from the server.

19. The system of claim 15, wherein the number of the plurality of speculative search queries also varies in accordance with a number of characters in the user input provided to the server.

20. The system of claim 15, wherein the number of the plurality of speculative search queries increases as a number of the plurality of suggested keywords obtained from the server increases.

* * * * *